United States Patent [19]
Wood et al.

[11] Patent Number: 5,209,551
[45] Date of Patent: May 11, 1993

[54] ANALOG SERVICE BRAKE RESPONSE ENHANCING CIRCUIT FOR RAILWAY VEHICLES

[75] Inventors: James A. Wood, Spartanburg; Richard J. Mazur, Greer, both of S.C.; John W. Drake, Cincinnati, Ohio

[73] Assignee: Westinghouse Air Brake Company, Wilmerding, Pa.

[21] Appl. No.: 706,473

[22] Filed: May 28, 1991

[51] Int. Cl.$^5$ .............................................. B60T 13/00
[52] U.S. Cl. .......................................... 303/7; 303/95
[58] Field of Search ...................... 303/92, 93, 95, 103, 303/7

[56] References Cited
U.S. PATENT DOCUMENTS

| | | | |
|---|---|---|---|
| 4,235,402 | 11/1980 | Matty et al. | 303/106 X |
| 4,669,046 | 3/1987 | Kabo | 303/92 X |
| 4,743,072 | 5/1988 | Brearley | 303/20 X |
| 4,949,779 | 3/1991 | Wood et al. | 303/102 X |

*Primary Examiner*—Robert J. Oberleitner
*Assistant Examiner*—Lee W. Young
*Attorney, Agent, or Firm*—J. B. Sotak

[57] ABSTRACT

An analog service brake response enhancing circuit including an intelligent filter circuit for removing voltage transients appearing on input feedback signals, a friction brake request circuit for receiving input brake command request signals, a force motor calculating circuit for calculating the degree of service brake which is to be applied on a railway vehicle, and service brake control apparatus for controlling whether an application or a release mode of braking should be instituted on the vehicle and for accelerating the operation of an analog valve device to produce a full service brake condition for a predetermined time period.

10 Claims, 2 Drawing Sheets

ANALOG SERVICE BRAKE RESPONSE ENHANCING CIRCUIT FOR RAILWAY VEHICLES

FIELD OF THE INVENTION

This invention relates to an analog service brake response enhancing arrangement, and more particularly to a process of improving the overall performance times of an analog brake valve by initially determining if the input command signal will cause the analog brake valve to be placed in an application state or a release state including means for comparing the present input command signal supplied to the analog brake valve with the previous input command signal and if the difference between the two input command signals is greater than a predetermined input setpoint, the input command signal is interrupted for an accelerated time period so that a full application signal or a full release signal is applied to the analog brake valve.

BACKGROUND OF THE INVENTION

In certain types of transportation systems, such as, in high speed railway and/or mass and rapid transit operations, the braking equipment included a portion called an "H-1 Electronic Unit" which functions to interpret electrical and pneumatic input signals and converts these signals into electric output signals for controlling the dynamic brake blending. The unit employed a process of dynamic brake enhancement which functioned to decrease the dynamic brake blending feedback dead times. However, dead times were still in the vicinity of three-hundred milliseconds (300 ms) for all braking requests. In addition, the previous units were not provided with an intelligent filter to eliminate voltage spikes in the dynamic brake feedback circuit. Further, the pre-existing equipment did not assist the performance of the analog brake valve during a stopping of a vehicle by only the friction brakes and also did not contribute to the valve performance during the transition period from a friction brake operation to a dynamic brake operation. However, upon further examination and experimentation, it appeared that the previous types of brake control systems did not adequately take into consideration the dead time problems related to an analog service brake valve.

OBJECTS AND SUMMARY OF THE INVENTION

Accordingly, it is an object of this invention to provide a new and unique analog service brake response enhancer to improve the overall response times of an analog brake valve.

Another object of this invention is an improved analog service brake response enhancing circuit which effectively reduces the overall application and release dead times of an analog brake valve.

A further object of this invention is to provide an analog service brake response enhancing arrangement employing an intelligent filter circuit, a friction brake request circuit, a force motor calculation circuit, an application brake sensor, a release brake sensor, an application acceleration circuit, a release acceleration circuit for controlling an analog valve device.

Yet another object of this invention is to provide an analog service brake response enhancing circuit comprising, means for filtering voltage spikes appearing on input feedback signals, means for receiving an input brake command request signal, means for calculating the amount of service brake which is to be applied on the vehicle, means for controlling whether an application or a release mode of braking should be instituted, means for accelerating the operation of an analog valve means to produce a full service condition for a predetermined time period.

Yet a further object of this invention is to provide an analog service brake response enhancer comprising, an intelligent filter circuit which removes electrical voltage transients from electric brake feedback signals and which compares the previous electrical brake feedback signal with the present electrical brake feedback signal to produce an output signal equal to the previous electrical brake feedback signal when the difference between the two electrical brake feedback signals exceeds a preselected setpoint and to produce an output signal equal to the present electrical brake feedback signal when the difference between the two electrical feedback signals does not exceed the preselected setpoint, a friction brake request circuit having one input derived from braking commands on a P-wire trainline and having another input representing the operating mode on a power/brake trainline to produce a brake rate request output signal, a force motor calculation circuit receiving the electrical brake feedback output signal from the intelligent filter circuit and the brake rate request output signal from the friction brake request circuit for producing a required force motor output signal in proportion to a friction brake request to a service brake control apparatus, said service brake control apparatus including an application brake sensor, an application acceleration circuit, a release brake sensor, a release acceleration sensor, and an analog valve device, the application and release brake sensors comparing a present force motor output signal with a previous force motor output signal for producing a first logical output signal if the difference of the two force motor output signals is greater than a predetermined setpoint and for producing a second logical output signal if the difference of the two force motor output signals is less than the predetermined setpoint, the first logical output signal of the application brake sensor causing the application acceleration circuit to interrupt the present force motor output signal applied to the analog valve device for a given time period during which the application acceleration circuit causes the analog valve device to produce a full service application signal, and conversely, the first logical output signal of the release acceleration sensor causing the release acceleration circuit to interrupt the present force motor output signal applied to the analog valve device for a given time period during which the release acceleration circuit causes the analog valve device to produce a full service release signal.

Still another object of this invention is to provide a novel analog service brake response enhancer which is economical in cost, reliable in use, durable in service, and effective in operation.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
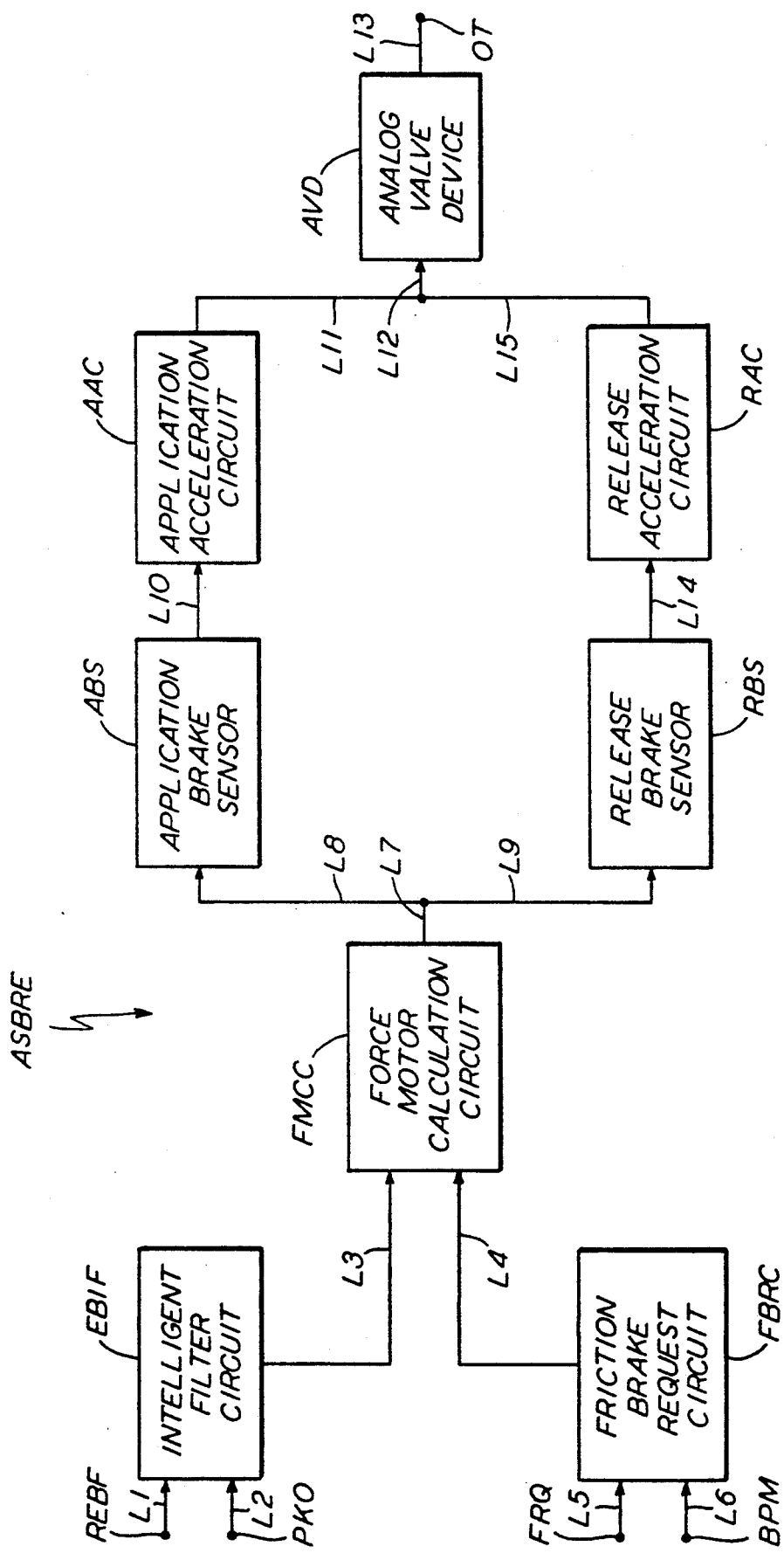
FIG. 1 is an illustration of a schematic block diagram of an analog service brake response enhancer in accordance with the present invention.

Referring now to the drawings and in particular to FIG. 1, there is shown a schematic circuit block diagram of the analog service brake response enhancer or enhancing circuit embodying the present invention which is generally characterized by letters ASBRE. As shown, an electric brake intelligent input filter circuit EBIF has a pair of input terminals REBF and PKO. The input terminal REBF is connected to the raw or unadulterated electric feedback signal via lead L1 while the input terminal PKO is connected by lead L2 to the per-axle sensing to per-truck control interface logic circuit which conditions the electric brake intelligent input filter circuit EBIF when no signal is present on terminal PKO. The circuit EBIF filters out or removes electrical voltage transients or spikes from the signals appearing on the input electric brake feedback terminal REBF. In operation, the logic filter circuit EPIF compares the previous program cycle electric brake feedback output signal to the present program cycle raw electric brake feedback input signal. If the difference between the two signals exceeds a selected setpoint, namely, twenty (20) bits, the previous program cycle electric brake feedback signal is developed on the output of the logic filter circuit EBIF. It will be appreciated that if this comparison process is repeated and activated for three consecutive program cycles, the previous program cycle electric brake feedback output signal must then equal the present program cycle raw electric brake input signal. If the difference between the two signals does not exceed 20 bits, then the output of the logic filter circuit EBIF is equal to present program cycle raw electric brake feedback input signal. Now if an input signal is developed on terminal PKO by the interface logic circuit, the filtering function is abrogated or bypassed so that the output will be equal to the present program cycle raw electric brake feedback input signal.

As shown, the output of the intelligent filter circuit EBIF is connected by lead L3 to a first input of a two-input force motor current calculation logic circuit FMCC. The logic circuit FMCC calculates the magnitude of the required force motor current which is to be conveyed to the service brake control apparatus, as will be described hereinafter. It will be seen that a friction brake rate request signal is conveyed to a second input of the force motor current calculation circuit FMCC via lead L4. The inputs to the friction brake command request circuit FBRC are derived and converted from the trainline braking commands on the P-wire trainline and from the operating mode on the power brake trainline. The input signals are initiated by the engineer or trainman who controls the desired braking level by manipulating a brake command controller located in the cab of the lead locomotive or vehicle. The friction brake command signals appearing on P-wire terminal FRQ, are conveyed to the input of the friction brake request circuit FBRC via lead L5. The conversion function is performed on every program cycle on a per-truck basis. The brake mode or power mode signals appearing on input terminal BPM are conveyed to the friction brake request circuit FBRC via lead L6. The P-wire signals on the terminal FRQ are inverted and converted to numerical values of zero (0) to one hundred and fifty (150), in which zero (0) represents zero miles per hour per second (0 mphps) and in which one-hundred and fifty (150) is equal to a deceleration rate of 3 mphps. Thus, this results in a 0.02 mphps per bit so that if the input is greater than 150 bits the output is 0 bits and if the input is less than 51 bits, the output is 150 bits. The following table shows a comparison of the inversion conversion of the inputs which are less than or equal to 153 and the inputs which are greater than or equal to 51 to produce a brake rate request output signal.

| Input | Output | Input | Output | Input | Output | Input | Output |
|---|---|---|---|---|---|---|---|
| 153 | 0 | 126 | 40 | 99 | 79 | 72 | 119 |
| 152 | 1 | 125 | 41 | 98 | 81 | 71 | 121 |
| 151 | 3 | 124 | 43 | 97 | 82 | 70 | 122 |
| 150 | 4 | 123 | 44 | 96 | 84 | 69 | 124 |
| 149 | 6 | 122 | 46 | 95 | 85 | 68 | 125 |
| 148 | 7 | 121 | 47 | 94 | 87 | 67 | 126 |
| 147 | 9 | 120 | 49 | 93 | 88 | 66 | 128 |
| 146 | 10 | 119 | 50 | 92 | 90 | 65 | 129 |
| 145 | 12 | 118 | 51 | 91 | 91 | 64 | 131 |
| 144 | 13 | 117 | 53 | 90 | 93 | 63 | 132 |
| 143 | 15 | 116 | 54 | 89 | 94 | 62 | 134 |
| 142 | 16 | 115 | 56 | 88 | 96 | 61 | 135 |
| 141 | 18 | 114 | 57 | 87 | 97 | 60 | 137 |
| 140 | 19 | 113 | 59 | 86 | 99 | 59 | 138 |
| 139 | 21 | 112 | 60 | 85 | 100 | 58 | 140 |
| 138 | 22 | 111 | 62 | 84 | 101 | 57 | 141 |
| 137 | 24 | 110 | 63 | 83 | 103 | 56 | 143 |
| 136 | 25 | 109 | 65 | 82 | 104 | 55 | 144 |
| 135 | 26 | 108 | 66 | 81 | 106 | 54 | 146 |
| 134 | 28 | 107 | 68 | 80 | 107 | 53 | 147 |
| 133 | 29 | 106 | 69 | 79 | 109 | 52 | 149 |
| 132 | 31 | 105 | 71 | 78 | 110 | 51 | 150 |
| 131 | 32 | 104 | 72 | 77 | 112 | | |
| 130 | 34 | 103 | 74 | 76 | 113 | | |
| 129 | 35 | 102 | 75 | 75 | 115 | | |
| 128 | 37 | 101 | 76 | 74 | 116 | | |
| 127 | 38 | 100 | 78 | 73 | 118 | | |

The service brake control apparatus includes an application brake sensor ABS, an application accelerator or acceleration circuit AAC, a release brake sensor RBS, a release acceleration circuit RAC, and an analog valve device AVD which control the amount or degree of service braking which is performed on a per-car basis. As shown, the output of the force motor calculation circuit FMCC is connected to the input of the application brake sensor ABS via leads L7 and L8 and is also connected to the input of the release brake sensor RBS via leads L7 and L9. Thus, the friction brake request is analyzed to determine if the analog valve device AVD is to be placed in an application mode of operation or a release mode of operation. If the analog valve device AVD is to be placed in an application state, the application brake sensor ABS compares the present force motor output signal with the previous force motor output signal. If the difference between the two signals is equal to or greater than a predetermined setpoint, the application brake sensor ABS outputs a first or logical "1" output signal to the input of the application acceleration circuit AAC via lead L10. The presence of a logical "1" causes the interruption of the present or current force motor signal for an application acceleration time period. During the application acceleration time period, the application accelerator AAC outputs a friction brake request signal via leads L11 and L12 which causes the analog brake valve device AVD to develop and to apply a full service application signal on lead L13 which is conveyed to the output terminal OT. After the expiration of the application acceleration time period, the current friction brake request is conveyed to the analog valve device AVD via leads L11 and L12 so that the brake request signal on output terminal OT returns the braking of the vehicle in accordance with the normal brake application command. Now if the difference between the two application signals is less than the predetermined set point, the application brake sensor ABS outputs a second or logical "0" to the input of the application accelerator or acceleration logic circuit AAC so that the analog valve device AVD proceeds to brake the vehicle in accordance with the current or present friction brake request.

Conversely, if the analog valve device AVD is to be placed in a release state, the release brake sensor RBS compares the current or present force motor output signal with the previous force motor output signal to determine the difference between the two signals. If the difference between the two force motor signals is less than a predetermined setpoint, the release brake sensor RBS outputs a logical "1" to the input of the release accelerator or acceleration circuit RAC via lead L14. The presence of the logical "1" input signal causes the interruption of the current force motor signal for a release acceleration time period. During this release acceleration time period, the release acceleration circuit RAC outputs a friction brake request signal via leads L15 and L12 which causes the analog valve device AVD to produce a full service release signal on lead L13 which is conveyed to the output terminal OT. After the release acceleration time period has expired, the current friction brake request is conveyed to the analog valve device AVD via leads L15 and L12 so that the brake request signal on output terminal OT causes the vehicle to return to the current brake release command. Now if the difference between the two release signals is not less than, namely, is greater than the predetermined setpoint, the release brake sensing circuit RBC outputs a logical "0" to the input of the release acceleration logic circuit RAC so that the analog valve device AVD proceeds to control the vehicle brakes in accordance with the current friction brake request.

It has been found that the present analog service brake response enhancer decreased the dead time period of the brake valve from 300 milliseconds to approximately 100 milliseconds for all braking requests. It will be appreciated that the analog service brake response enhancer continues to monitor the current input signal during both the application acceleration time period and the release acceleration time period. This permits the enhancing device to take appropriate action during periods of transition that may occur during acceleration and deceleration time periods. It will be seen that the analog service brake response enhancer also monitors the raw electric feedback signal so that it senses a change in the mode of operation, namely, a transition of power to brake of the electric motors. Under such an electric brake cut-in condition, a valve acceleration value is added via the filter circuit EBIF and force motor circuit FMCC until electric brake feedback reaches an acceleration cutout value. At the point of transition, an unmodified electric brake feedback is used to determine the correct friction brake request. In addition, the analog service brake response enhancer is capable of sensing a condition in which the electric braking can no longer sustain its portion of the requested brake rate. Under such a condition, a valve deceleration value is subtracted from the electric brake feedback until a deceleration cutout value is reached. This deceleration value is tapered in accordance with the received electric brake feedback signal.

Figure 2:
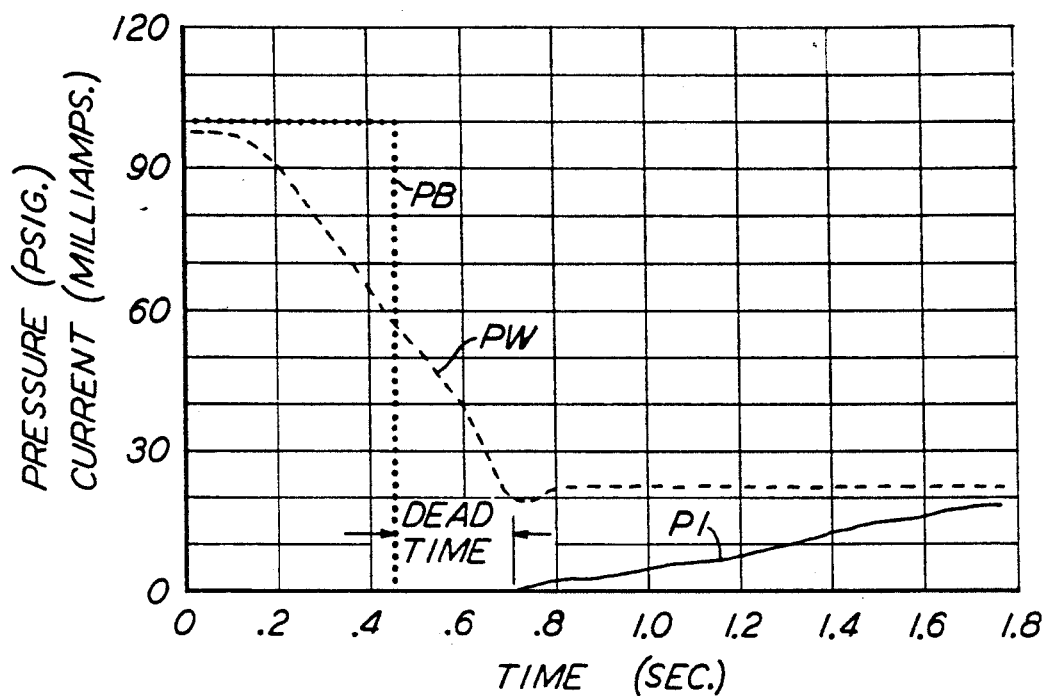
FIG. 2 is a graphical illustration of the response curves of analog service brake valve which does not include the enhancing circuit of the present invention.

Referring now to FIG. 2, there is shown the response curves of a service brake application taking place on a railway vehicle which is not equipped with the presently disclosed analog service brake response enhancing circuit. As shown, the abscissa is representative of time which is graduated into intervals of two tenths of a second while the ordinate is graduated into intervals of ten, which is representative of pressure (psig) and current (milliamps). As shown, the power brake trainline curve PB is depicted by the dotted line while the P-wire trainline curve PW is represented by the dashed line. It will be seen that the brake cylinder pressure response curve is shown as a solid line PI. It will be noted that when the vehicle is in the power mode, the power brake trainline curve PB is at one hundred milliamps (100 ma). At this time, the P-wire trainline is also at approximately one hundred milliamps (100 ma) which is representative of a plus three mile per hour per second (+3 mphps) acceleration rate request. Conversely, during a zero mile per hour per second (0 mphps) request, the P-W trainline PW will be at approximately sixty milliamps (60 ma), and during a minus three mile per hour per second (−3 mphps) deceleration rate request, the P-W trainline PW will drop to approximately twenty milliamps (20 ma).

Let us assume that a power to brake transition is initiated at approximately 0.450 seconds. It will be seen from FIG. 2 that the power/brake trainline curve PB almost immediately drops from 100 ma level to 0 ma level. As soon as the brakes are applied, the P-W brake line curve PW will continue to decrease until it reaches 20 ma at approximately 0.750 seconds. Thus, it will be seen that a brake application dead time of 300 milliseconds occurs from the initial service brake request and the actual service brake application in the revenue service braking equipment which is without the enhancing apparatus of the present invention.

Figure 3:
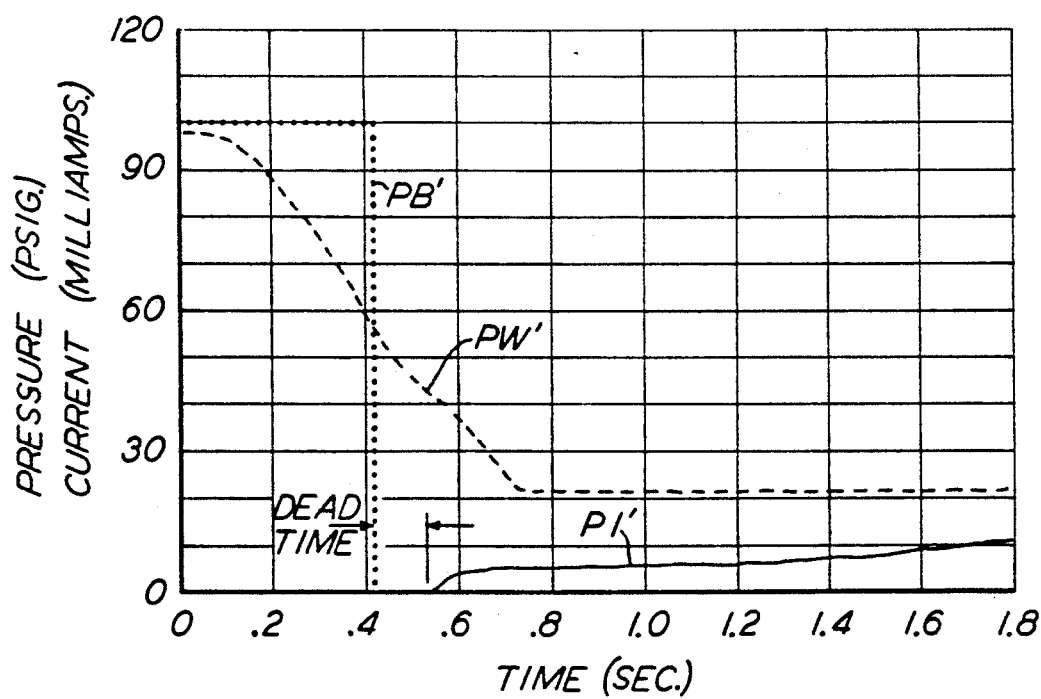
FIG. 3 is a graphical illustration of the response curves which occur when an analog service brake valve is provided with the enhancing circuit of the present invention.

Turning now to FIG. 3 of the drawings, there is shown the improved performance results of the analog service brake apparatus which includes the response enhancer circuit of FIG. 1. As shown, the curves of FIG. 3 are represented by the solid line brake cylinder pressure curve PI', the dotted line power/brake trainline curve PB', and the dashed line P-wire trainline curve PW'.

Again, let us assume that a power to brake operational change occurs at approximately 0.425 seconds so that the power/brake trainline curve PB' nearly instantaneously falls from a 100 ma current value to a 0 ma current value. It will be observed that the slop of P-wire trainline curve PW' is substantially the same as the slope of P-wire trainline curve PW of FIG. 2, however, the brake cylinder pressure PI' is initiated in approximately 0.525 seconds so that the brake application dead time is only a 100 milliseconds. That is, the dead time extends from 0.425 to 0.525 seconds which is approximately three times shorter than dead time of FIG. 2. Thus, the analog service valve response enhancing circuit results in a three hundred percent (300%) improvement in the application of the brake cylinder pressure.

Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

What we claim is:

1. An analog service brake response enhancing circuit comprising, means for filtering voltage spikes appearing on an input feedback signal terminal, means for converting input signals appearing on a brake command request signal terminal, said converting obtaining friction brake command signals appearing on a P-wire trainline terminal and obtaining an operating mode signal appearing on a power/brake trainline terminal, means for calculating a given amount of service brake which is to be applied on a vehicle, said calculating means is a force motor logic circuit which produces an output proportional to the friction brake command signals received from said converting means, means for controlling whether an application and a release mode of braking should be instituted said control means including an application brake sensor for comparing the present output of said force motor logic circuit with a previous output of said force motor logic circuit and for causing an application accelerating circuit to produce a first logic output signal when the difference of said present output of said force motor logic circuit and said previous output of said force motor logic circuit is greater than a predetermined setpoint, and means for accelerating the operation of an analog valve means to produce a full service brake signal for a predetermined time period.

2. The analog service brake response enhancing circuit as defined in claim 1, wherein said filtering means is conditioned by the lack of an input signal by an interface logic circuit.

3. The analog service brake response enhancing circuit as defined in claim 1, wherein said application accelerating circuit produces a second logical output signal when the difference of said present output of said force motor logic circuit and said previous output of said force motor logic circuit is less than said predetermined setpoint.

4. The analog service brake response enhancing circuit as defined in claim 3, wherein said second logical output signal causes said analog valve means to produce an output signal to cause the braking of the vehicle in accordance with a current friction brake request.

5. The analog service brake response enhancing circuit as defined in claim 1, wherein said control means includes a release brake sensor for comparing a present output of said force motor logic circuit with a previous output of said force motor logic circuit and for causing a release accelerating circuit to produce a first logical output signal when the difference of said present output of said force motor logic circuit and said previous output of said force motor logic circuit is less than a predetermined setpoint.

6. The analog service brake response enhancing circuit as defined in claim 5, wherein said release accelerating circuit produces a second logical output signal when the difference of said present output of said force motor logic circuit and said previous output of said force motor logic circuit is greater than said predetermined setpoint.

7. The analog service brake response enhancing circuit as defined in claim 6, wherein said second logical output signal causes said analog valve means to produce an output signal to cause the braking of the vehicle in accordance with a current friction brake request.

8. The analog service brake response enhancing circuit as defined in claim 5, wherein said first logical output signal causes said analog valve means to produce an output signal to cause a full service brake release during said predetermined time period.

9. The analog service brake response enhancing circuit as defined in claim 1, wherein said first logical output signal causes said analog valve means to produce a full service brake application signal during said predetermined time period.

10. An analog service brake response enhancer comprising, an intelligent filter circuit which removes electrical voltage transients from an electric brake feedback signal terminal and which compares a previous electric brake feedback signal with a present electric brake feedback signal to produce an output signal equal to the previous electric brake feedback signal when a difference between the present and previous electric brake feedback signals exceeds a preselected setpoint and to produce an output signal equal to the present electric brake feedback signal when the difference between the present and previous electric feedback signals does not exceed the preselected setpoint, a friction brake request circuit having one input derived from braking commands on a P-wire trainline and having another input representing the operating mode on a power/brake trainline to produce a brake rate request output signal, a force motor calculation circuit receiving the electric brake feedback output signal from said intelligent filter circuit and the brake rate request output signal from said friction brake request circuit for conveying a required amount of force motor output signal in proportion to a friction brake request to a service brake control apparatus, said service brake control apparatus including an application brake sensor, an application acceleration circuit, a release brake sensor, a release acceleration sensor, and an analog valve device, said application and release brake sensors comparing a present force motor output signal with a previous force motor output signal for producing a first logical output signal if a difference of the present and previous force motor output signals is greater than a predetermined setpoint and for producing a second logical output signal if the difference of the present and previous force motor output signals is less than the predetermined setpoint, said first logical output signal of said application brake sensor causing said application acceleration circuit to interrupt the present force motor output signal applied to said analog valve device for a given time period during which said application acceleration circuit causes said analog valve device to produce a full service application signal and, conversely, said first logical output signal of said release brake sensor causing said release acceleration circuit to interrupt the present force motor output signal applied to said analog valve device for a given time period during which said release acceleration circuit causes said analog valve device to produce a full service release signal.

* * * * *